US011933906B2

United States Patent
Sun et al.

(10) Patent No.: US 11,933,906 B2
(45) Date of Patent: Mar. 19, 2024

(54) WEARABLE ACCESSORIES FOR DETERMINING ACCURATE ELEVATION INFORMATION FOR NAVIGATION

(71) Applicant: Google LLC, Mountain View, CA (US)

(72) Inventors: Ming Sun, Mountain View, CA (US); Fei He, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 107 days.

(21) Appl. No.: 17/480,763

(22) Filed: Sep. 21, 2021

(65) Prior Publication Data

US 2023/0087934 A1 Mar. 23, 2023

(51) Int. Cl.
*G01S 19/48* (2010.01)
*G01S 19/31* (2010.01)
*G01S 19/45* (2010.01)
G01C 5/06 (2006.01)
G01S 19/05 (2010.01)
G01S 19/40 (2010.01)
H04W 4/02 (2018.01)

(52) U.S. Cl.
CPC ............ *G01S 19/48* (2013.01); *G01S 19/31* (2013.01); *G01S 19/45* (2013.01); G01C 5/06 (2013.01); G01S 19/05 (2013.01); G01S 19/40 (2013.01); H04W 4/025 (2013.01)

(58) Field of Classification Search
CPC .......... G01S 19/48; G01S 19/05; G01S 19/31; G01S 19/53; G01S 19/51; G01S 19/45; G01S 19/40
USPC ............ 342/357.31, 357.34, 357.28, 357.42, 342/357.71, 357.23, 357.36
See application file for complete search history.

(56) References Cited

U.S. PATENT DOCUMENTS

| | | | | |
|---|---|---|---|---|
| 5,265,025 A | * | 11/1993 | Hirata | G01S 19/48 342/450 |
| 5,646,857 A | * | 7/1997 | McBurney | G01C 5/00 701/489 |
| 7,692,583 B2 | * | 4/2010 | Watanabe | G01C 21/28 342/357.29 |
| 8,306,676 B1 | * | 11/2012 | Ingvalson | G01C 21/20 701/4 |
| 9,429,656 B2 | * | 8/2016 | Garin | G01L 19/08 |
| 10,353,079 B2 | * | 7/2019 | Soysal | G01S 19/48 |
| 10,612,919 B2 | * | 4/2020 | Shirai | G01S 19/42 |

(Continued)

Primary Examiner — Chuong P Nguyen
(74) Attorney, Agent, or Firm — Lerner David LLP

(57) ABSTRACT

A system and method are provided for data fusion between portable electronic devices and wearable accessories that is used to improve location information, particularly with respect to vertical location. A barometer sensor in a wearable accessory is used to obtain relative accurate height information, and an ultra wide band (UWB) radio is used to determine the distance between the wearable accessory and the portable electronic device. At a second timestamp, a barometer in a wearable device is used to calculate a difference in elevation between the first timestamp and the second timestamp. This measurement, along with a measured distance between the devices, can be used to accurately determine elevation. The wireless accessory and the portable electronic device communicate the obtained height and distance information. Accordingly, accurate navigation signals may be provided, even where multiple levels of roadways overlap, such as in parking garages or complex highway interchanges.

17 Claims, 5 Drawing Sheets

(56) References Cited

U.S. PATENT DOCUMENTS

| | | | |
|---|---|---|---|
| 11,467,291 B2* | 10/2022 | Blaha, Jr. | G01W 1/10 |
| 2014/0011540 A1 | 1/2014 | Miyake | |
| 2014/0012529 A1* | 1/2014 | Lee | G01C 5/06 |
| | | | 702/94 |
| 2014/0172351 A1* | 6/2014 | Barfield | G01C 5/06 |
| | | | 702/138 |
| 2015/0138014 A1* | 5/2015 | Park | G01S 19/14 |
| | | | 342/357.66 |
| 2015/0330779 A1* | 11/2015 | Moeglein | G01C 5/06 |
| | | | 342/462 |
| 2017/0005958 A1 | 1/2017 | Frenkel et al. | |
| 2017/0023361 A1* | 1/2017 | Sano | G01C 5/06 |
| 2017/0205232 A1 | 7/2017 | Shirai | |
| 2022/0317309 A1* | 10/2022 | Gamble, Jr. | G01S 19/42 |

\* cited by examiner

WEARABLE ACCESSORIES FOR DETERMINING ACCURATE ELEVATION INFORMATION FOR NAVIGATION

BACKGROUND

Portable electronic devices, such as phones and tablets, are widely used for navigation. As such, the devices utilize location information from a global positioning system (GPS). However, GPS can be limited and therefore make it difficult to provide accurate information. For example, on a complex interchange with multiple levels of roadways, the GPS information may not be sufficient to accurately determine on which level of roadway the user is traveling.

BRIEF SUMMARY

A system and method are provided for data fusion between portable electronic devices and wearable accessories that is used to improve location information, particularly with respect to vertical location. A barometer sensor in a wearable accessory is used to obtain relative accurate height information, and an ultra wide band (UWB) radio is used to determine the distance between the wearable accessory and the portable electronic device. For example, coordinates are received at a first timestamp when reliable GPS information is available. At a second timestamp, when reliable GPS information is not available, a barometer in a wearable device is used to calculate a difference in elevation between the first timestamp and the second timestamp. This measurement, along with a measured distance between the wearable device the portable device used for navigation, can be used to accurately determine elevation. The wireless accessory and the portable electronic device communicate the obtained height and distance information, for example, using Bluetooth or other wireless pairing technology. Accordingly, accurate navigation signals may be provided, even where multiple levels of roadways overlap, such as in parking garages or complex highway interchanges.

One aspect of the disclosure provides a portable electronic device, comprising a memory, a communication interface configured for wireless communication with a wearable accessory, and one or more processors in communication with the memory and the communication interface. The one or more processors are configured to receive first location information from a navigation system at a first time, receive first barometric information from the wearable accessory at the first time, receive second location information from the navigation system at a second time, receive, from the wireless accessory, second barometric information from the wearable accessory at the second time, detect a change in vertical distance between the portable electronic device and the wireless accessory from the first time to the second time, and determine updated second location information, including at least a z coordinate for the second time, based on the second location information, the first and second barometric information, and the change in vertical distance. In detecting the change in vertical distance the one or more processors are further configured to determine first relative position information indicating a first relative height of the wearable device with respect to the portable electronic device at the first time, determine second relative position information indicating a second relative height of the wearable device with respect to the portable electronic device at the second time, and compare the second relative height to the first relative height.

Another aspect of the disclosure provides a method of determining elevation information, comprising receiving, with one or more processors, first location information from a navigation system at a first time, receiving, with the one or more processors, first barometric information from the wearable accessory at the first time, receiving, with one or more processors, second location information from the navigation system at a second time, receiving, from the wireless accessory, second barometric information from the wearable accessory at the second time, detecting, with the one or more processors, a change in vertical distance between the portable electronic device and the wireless accessory from the first time to the second time, and determining, with one or more processors, updated second location information, including at least a z coordinate for the second time, based on the second location information, the first and second barometric information, and the change in vertical distance.

Another aspect of the disclosure provides a non-transitory computer-readable medium storing instructions executable by one or more processors for performing a method of determining elevation information, comprising receiving first location information from a navigation system at a first time, receiving first barometric information from the wearable accessory at the first time, receiving second location information from the navigation system at a second time, receiving, from the wireless accessory, second barometric information from the wearable accessory at the second time, detecting a change in vertical distance between the portable electronic device and the wireless accessory from the first time to the second time, and determining updated second location information, including at least a z coordinate for the second time, based on the second location information, the first and second barometric information, and the change in vertical distance.

DETAILED DESCRIPTION

Wearable devices, such as earbuds, smart glasses, smart watches, or the like, may be equipped with a barometric sensor, ultra wide band (UWB) radio, and other features. The barometric sensor in the wearable device can be used to get relative accurate height information, and the UWB radio can be used to determine a distance between the accessory and a host device used for navigation, such as a phone or tablet. The accessory and the host can communicate such information over a wireless pairing, such as a Bluetooth connection.

Figure 1A:
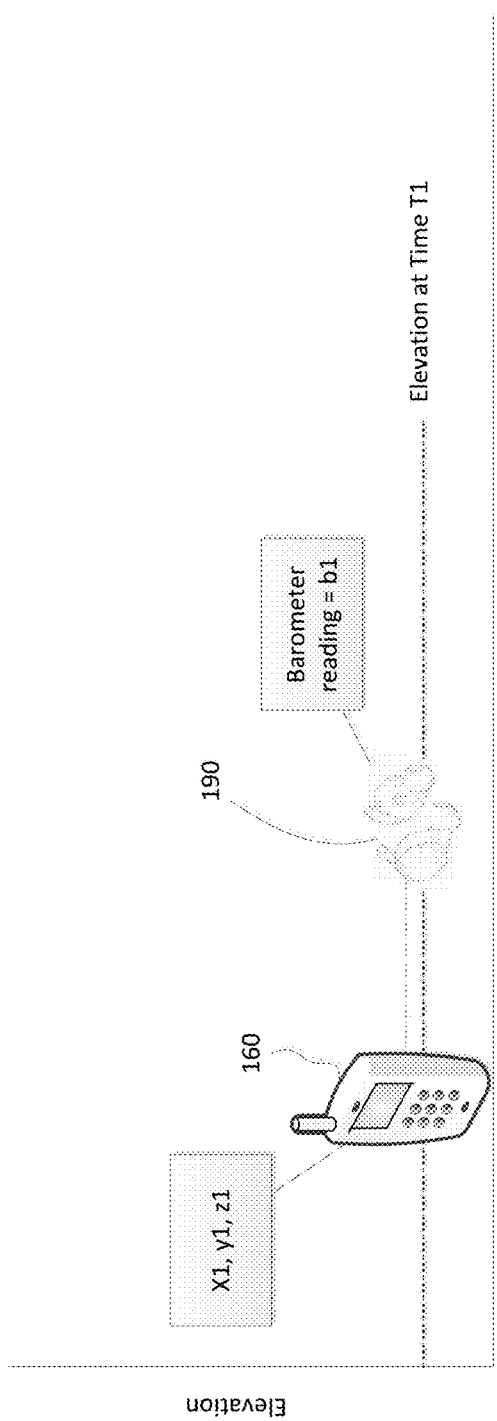
FIGS. 1A-C are pictorial diagrams of an example system detecting a change in elevation according to aspects of the disclosure.
Figure 1B:
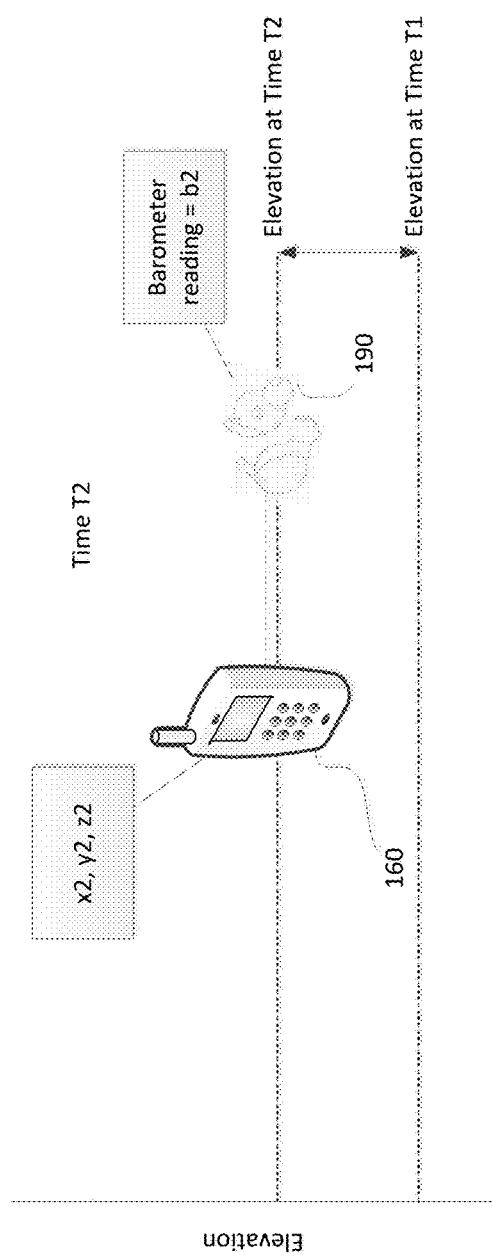

FIGS. 1A-1B illustrate wirelessly paired devices determining location information, including accurate height or elevation information. FIG. 1A illustrates a host device 160 that is wirelessly paired with a wireless accessory 190, such as through Bluetooth or any other wireless pairing technology. The host device 160 is equipped with navigation features. The host device 160 receives first location coordinates at a first time, T1. The location coordinates may include x, y, z coordinates. According to some examples, the first location coordinates may be known to have a predetermined degree of accuracy. For example, accuracy of a 3-dimensional (3D) coordinate can be reported by a 3D coordinate fix.

At the same time T1, the wireless accessory 190 obtains a reading from its barometric sensor, the reading providing a first value, b1. The value b1 may be used as a baseline for determining relative changes in height at future times. The wireless accessory 190 may communicate the value b1 to the host device 160, where it may be stored, for example in cache in association with the first location coordinates.

The host 160 may further detect position information relative to the wireless accessory 190, for example using UWB. For example, the host 160 may detect a distance and relative angle between the host 160 and the wireless accessory 190.

In FIG. 1B, the host device 160 and the wireless accessory 190 have changed position to a new height or elevation at a second time, T2. This may occur, for example, when a user of the devices is traveling uphill or downhill, to a different level of a parking garage or other structure, on an on-ramp or off-ramp, etc. At time T2, the host 160 receives second location information, including x, y, z coordinates. An accuracy of the z coordinate at time T2 may be unverified. The wireless accessory 190 at time T2 obtains a second reading from its barometric sensor, providing a second value b2. The difference between b2 and b1 may indicate a relative change in height or elevation from time T1 to time T2. The host may again use UWB to determine a distance and angle between the host 160 and the accessory 190. If such information has not changed, as shown in FIG. 1B, then the change in height calculated as (b2–b1) may be added to the first z location coordinate (z1) to provide an updated second z location coordinate (z2).

Figure 1C:
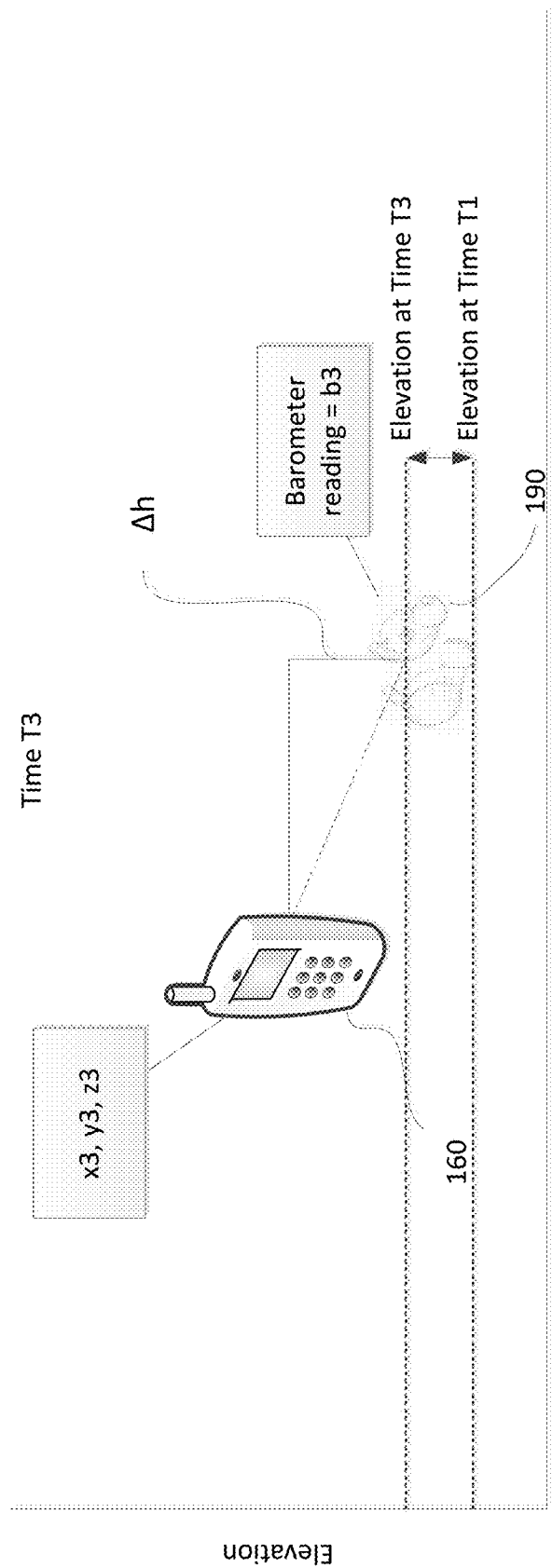

FIG. 1C illustrates an example where the wireless accessory 190 changes in height/elevation at time T3 as compared to its initial position at time T1, and also changes in relative position with respect to the host device 160. As such, both the change in height calculated from the barometric sensor as well as a change in relative height determined using UWB can be used to determine the updated z coordinate. For example, at time T3, the host device 190 receives third location information including coordinates x3, y3, z3. At the same time, the wireless accessory 190 obtains barometric sensor reading providing value b3. Additionally, UWB radios in one or both devices determine relative position between the devices. The relative position includes distance and angle. As such, a differential in height (4h) can be determined. This height differential Δh at time T3 may be compared to the height differential at time T1, which in this example is zero as the host 160 and accessory 190 are illustrated in FIG. 1A as being at the same relative height at time T1. The comparative height differential Δh at time T3 is added to the difference in elevation between time T3 and T1, which is added to the first z coordinate z1 to obtain an updated z coordinate z3 for time T3.

In this example, the host device 160 is illustrated as a phone and the wireless accessory 190 is illustrated as a pair of earbuds. The host device 160 may in other examples be a tablet, handheld gaming system, dashboard navigation system, or any other portable electronic device equipped with navigation features. The wireless accessory 190 may in other examples be a smartwatch, smart glasses, smart helmet, smart clothing, or any other type of wearable electronic device equipped with one or more sensors and a communication interface for communication with the host 160.

Figure 2:
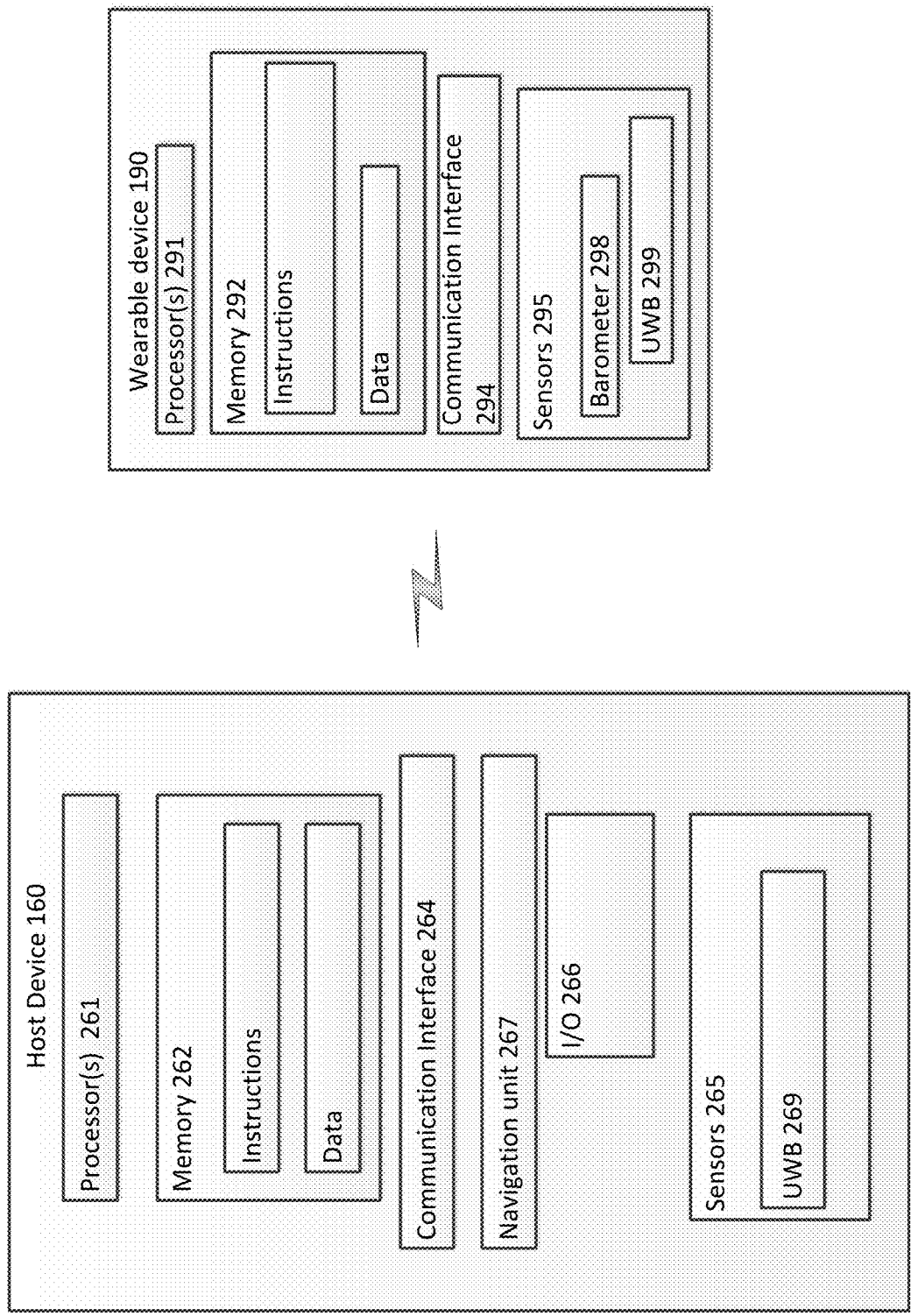
FIG. 2 is a block diagram of an example system according to aspects of the disclosure.

FIG. 2 illustrates example computing devices in the system, and features and components thereof.

The host 160 may include components, including a processor 261, memory 262, communication interface 264, and sensors 265. Such sensors may include, without limitation, UWB sensor 269, and any of a variety of other types of sensors.

The host device 160 may receive signals from the wearable device 190. For example, the host device 160 may receive barometric sensor readings or other information indicating detected elevation from the wearable device 190. The host device 160 may communicate with the wearable device 190 using communication interface 264. For example, the communication interface 264 may include a Bluetooth transceiver or any other components configured for wireless pairing with the wearable device 190. While UWB 269 is illustrated in FIG. 2 as a sensor, it may be integrated as part of the communication interface 264.

Figure 3:
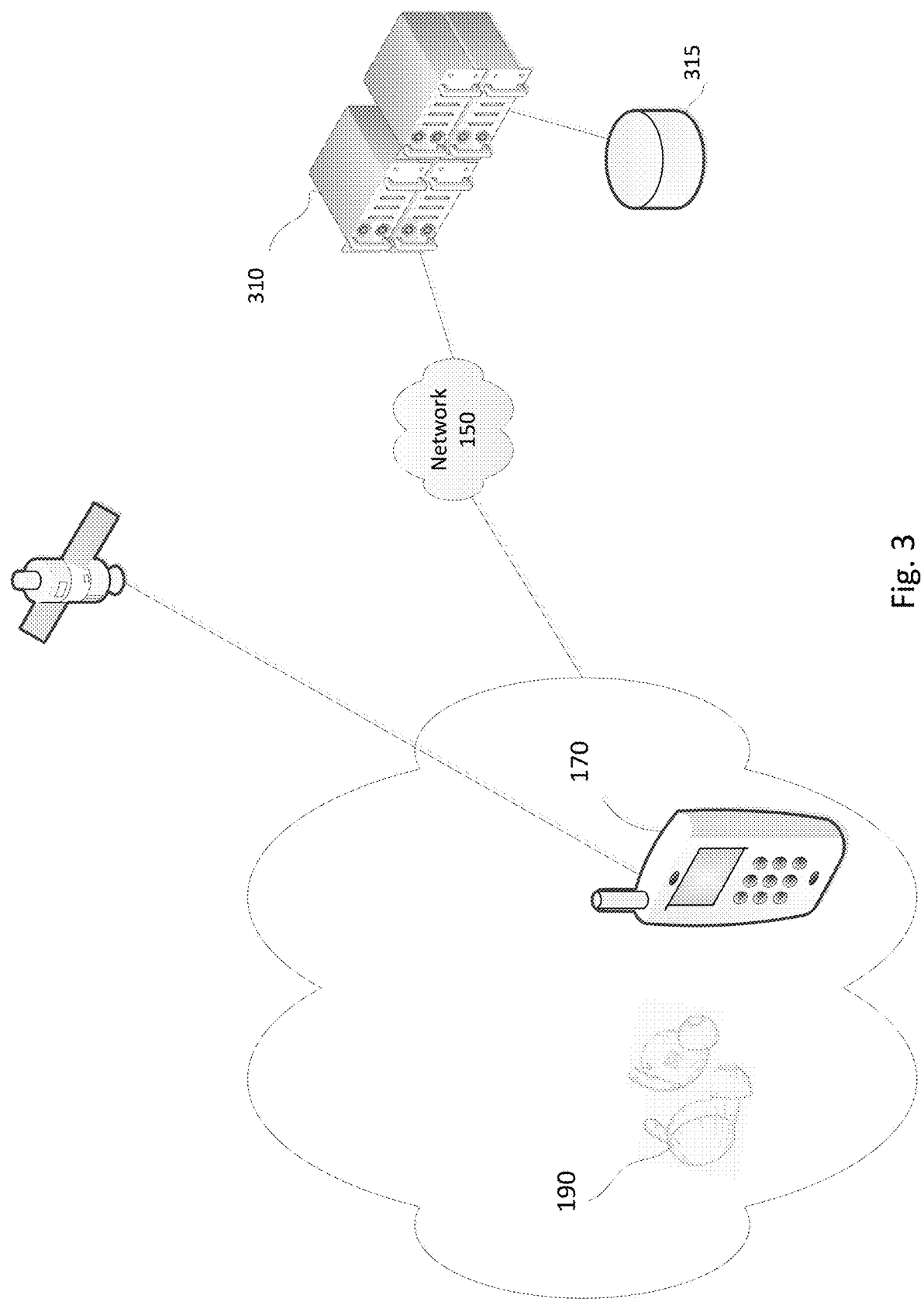
FIG. 3 is a pictorial diagram of another example system according to aspects of the disclosure.

The host device 160 may also communicate with other devices, such as one or more servers or satellites, as described further in connection with FIG. 3. In that regard, the communication interface 264 may further include components enabling cellular communication, wireless network connection, GPS communication, or any of a variety of other types of communication.

Navigation unit 267 may include, for example, a components and software configured for detecting a location of the host device 160 and providing turn-by-turn directions for navigating a roadway, walkway, or other travel passage. The navigation unit 267, while illustrated as a separate component, may be integrated with or in communication with the processor 261, memory 262 and or I/O 266.

The host device 160 may also include one or more processors 261 in communication with memory 262 including instructions 263 and data 264. The host device 260 may further include elements typically found in computing devices, such as input/output (I/O) 266, etc.

The I/O 266 may be used to receive information from a user and provide information to the user. For example, the I/O 266 may include a display and speaker for providing audible and visual navigation directions to the user. The I/O 266 may further include, for example, one or more touch sensitive inputs, a microphone, a camera, haptic feedback, etc.

The one or more processor 261 may be any conventional processors, such as commercially available microprocessors. Alternatively, the one or more processors may be a dedicated device such as an application specific integrated circuit (ASIC) or other hardware-based processor. Although FIG. 2 functionally illustrates the processor, memory, and other elements of host device 260 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of host device 260. Accordingly, references to a processor or computing device will be understood to include references to a collection of processors or computing devices or memories that may or may not operate in parallel.

Memory 262 may store information that is accessible by the processors 261, including instructions that may be executed by the processors 261, and data. The memory 262 may be of a type of memory operative to store information accessible by the processors 261, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 263 and data 264 are stored on different types of media.

Data may be retrieved, stored or modified by processors 261 in accordance with the instructions. For instance, although the present disclosure is not limited by a particular data structure, the data may be stored in computer registers, in a relational database as a table having a plurality of different fields and records, XML documents, or flat files. The data may also be formatted in a computer-readable format such as, but not limited to, binary values, ASCII or Unicode. By further way of example only, the data 264 may be stored as bitmaps comprised of pixels that are stored in compressed or uncompressed, or various image formats (e.g., JPEG), vector-based formats (e.g., SVG) or computer instructions for drawing graphics. Moreover, the data 264 may comprise information sufficient to identify the relevant information, such as numbers, descriptive text, proprietary codes, pointers, references to data stored in other memories (including other network locations) or information that is used by a function to calculate the relevant data.

The instructions may be executed to compute a location including an accurate z coordinate. For example, the instructions may be executed to receive location information, for example, from a GPS satellite, and to also receive corresponding timestamped elevation information from the wearable device 190. Moreover, the host device may detect, using the UWB 269, relative position of the wearable device 190 with respect to the 160, including changes in relative height between a first timestamp and a second timestamp. Using this information, the host 160 can compute an accurate z coordinate location information.

Wearable device 190 includes various components, such as a processor 291, memory 292 including data and instructions, communication interface 294, sensors 295, and other components typically present in wearable wireless computing devices. The wearable device 190 may have all of the components normally used in connection with a wearable computing device such as a processor, memory (e.g., RAM and internal hard drives) storing data and instructions, user input, and output. Components such as processor 291, memory 292, etc. may be similar to those described above with respect to the host 160.

The communication interface 294 may provide for communication with the host device 160. For example, the communication interface 294 may include an antenna, transmitter, and receiver that allows for wireless coupling with another device. The wireless coupling may be established using any of a variety of techniques, such as Bluetooth, Bluetooth low energy (BLE), ultra wide band (UWB), etc. According to some examples, the communication interface 294 may also provide for communication with a user of the device. For example, the communication interface 294 may further include a display, speaker, input controls, or any of a variety of other features for user interaction.

The sensors 295 may be capable of detecting environmental conditions indicating elevation, such as barometric pressure, in addition to detecting other parameters such as relative proximity to the host 160. The sensors may include, for example, a barometer 298 and UWB sensor 299. According to some examples, the wearable device 190 may additionally or alternatively include any of a variety of sensors to detect elevation, relative position, or any of a number of other conditions, whether or not related to navigation. For example, other sensors may include a motion sensor, temperature sensor, a magnetometer, a pedometer, a global positioning system (GPS), proximity sensor, strain gauge, camera, microphone, etc. The one or more sensors of may operate independently or in concert.

The proximity sensor or UWB sensor may be used to determine a relative position, such as angle and/or distance, between the wearable device 190 and the host 160.

While one wearable device 190 is illustrated in FIG. 2, in some examples data from multiple wearable electronic devices may be received by the host 160 and used to compute accurate z coordinate location information. The data from different wearable devices may be weighted, for example, based on type of device, compared for establishing a confidence score in the accuracy of the data, combined, etc.

FIG. 3 illustrates the wireless wearable device 190 in communication with the host device 160. In this example, the devices 160, 190 are further in communication with server 310 and database 315 through network 150. For example, the wireless wearable device 190 may be indirectly connected to the network 150 through the host 160. In other examples, the wearable device 190 may be directly connected to the network 150, regardless of a presence of the host 160.

The network 150 may be, for example, a LAN, WAN, the Internet, etc. The connections between devices and the network may be wired or wireless.

The server computing device 310 may actually include a plurality of processing devices in communication with one another. According to some examples, the server 310 may execute the machine learning model for determining a particular type of exercise being performed based on input from the wearable devices and surrounding devices. For example, the wearable device 190 may transmit raw elevation data detected from barometric sensor or other sensors to the server 310 if authorized by the user. The server 310 may perform computations using the received raw data as input, such as computing z coordinate location information and generating corresponding navigation instructions. According to other examples, one or more of the devices 160, 190 may access data, such as a library of map data or other data, and use such data in generating navigation instructions, etc.

Databases 315 may be accessible by the server 310 and computing devices 160-190. The databases 315 may include, for example, a collection of map data from various sources.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
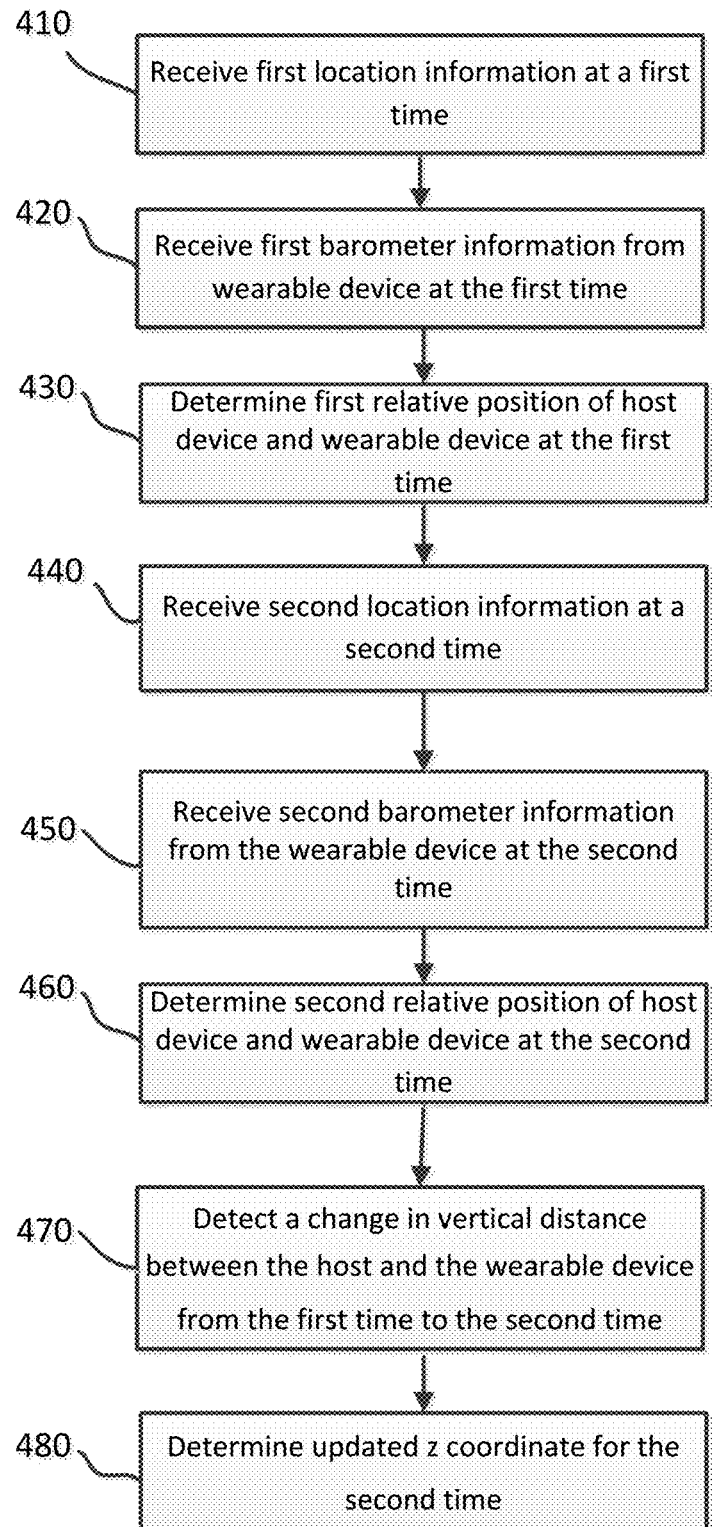
FIG. 4 is a flow diagram illustrating an example method of determining a z coordinate location using barometric sensor information from a wearable device according to aspects of the disclosure.

FIG. 4 illustrates an example method 400 of computing z location information using data fusion between a host device, such as a phone or tablet, and a wearable electronic device, such as earbuds, smart glasses, etc.

In block 410, the host device receives first location information at a first time. The first location information may be received from, for example, a GPS system or other navigation system. The first location information may include x, y, and z coordinates. According to some examples, the first location information may have a predetermined degree of accuracy for each of the x, y, and z coordinates.

In block 420, the host device receives first barometer information from the wearable device at the first time. The first barometer information may be, for example, readings from the barometer. In other example, the first barometer information may be a corresponding value or other information indicating a detected elevation of the wearable device. The first barometer information may be correlated with the first location information, including the z coordinate, and utilized as a baseline for comparison to future barometer readings.

In block 430, the host device detects a relative position between the host device and the wearable device at the first time. For example, the host device may use a UWB radio to detect a relative distance and angle between the host device and the wearable device. Using such information, the host device may further compute a relative height between the host device and the wearable device.

In block 440, the host device receives second location information at a second time. The second location information may also include x, y, z coordinates. However, the second location information may not meet a threshold accuracy with respect to the z coordinate.

In block 450, the host receives second barometer information from the wearable device at the second time. The second barometer information may be transmitted in the same format as the first barometer information.

In block 460, the host device determines second relative position information between the host device and the wearable device at the second time. Similar to the first relative position, the second relative position may include distance, angle, and relative height.

In block 470, the host detects a change in vertical distance between the host and the wearable device. For example, the host device may compute a differential between the relative height at the second time and the relative height at the first time.

In block 480, the host device computes updated z coordinate information for the second time based on the received barometer information and the detected change in relative vertical distance. For example, the updated z coordinate information may be computed as: (the first location information z coordinate) plus (the detected change in vertical distance between the host and the wearable device from the first time to the second time) plus (a change in detected elevation based on the second barometer information minus the first barometer information).

The foregoing system and method are advantageous in that they provide for reliable elevation information when it may otherwise not be available from GPS or other sources. As such, this reliable information can be used to provide accurate navigation information in situations where multiple levels of roadway are present, such as complex highway interchanges, parking garages, or the like.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A portable electronic device, comprising:
a memory;
a communication interface configured for wireless communication with a wearable accessory;
one or more processors in communication with the memory and the communication interface, the one or more processors configured to:
receive first location information from a navigation system at a first time;
receive first barometric information from the wearable accessory at the first time;
receive second location information from the navigation system at a second time;
receive second barometric information from the wearable accessory at the second time;
detect a change in vertical distance between the portable electronic device and the wearable accessory from the first time to the second time;
determine updated second location information, including at least a z coordinate for the second time, based on the second location information, the first and second barometric information, and the change in vertical distance; and
provide turn-by-turn navigation instructions using the updated second location information.

2. The portable electronic device of claim 1, wherein in detecting the change in vertical distance the one or more processors are further configured to:
determine first relative position information indicating a first relative height of the wearable accessory with respect to the portable electronic device at the first time;
determine second relative position information indicating a second relative height of the wearable accessory with respect to the portable electronic device at the second time; and
compare the second relative height to the first relative height.

3. The portable electronic device of claim 2, wherein in determining the first and second relative position information the one or more processors are further configured to detect distance and angle information and compute the relative height based on the distance and angle information.

4. The portable electronic device of claim 2, further comprising an ultra wide band radio configured to determine the first and second relative position information.

5. The portable electronic device of claim 1, wherein the one or more processors are further configured to determine that the first location information includes a degree of accuracy meeting a predetermined threshold.

6. The portable electronic device of claim 5, wherein the one or more processors are further configured to determine that the second location information includes a degree of accuracy that does not meet the predetermined threshold.

7. The portable electronic device of claim 1, wherein the communication interface comprises a wireless pairing transceiver.

8. A method of determining elevation information, comprising:
receiving, with one or more processors, first location information from a navigation system at a first time;

receiving, with the one or more processors, first barometric information from a wearable accessory at the first time;

receiving, with one or more processors, second location information from the navigation system at a second time;

receiving second barometric information from the wearable accessory at the second time;

detecting, with the one or more processors, a change in vertical distance between a portable electronic device and the wearable accessory from the first time to the second time;

determining, with one or more processors, updated second location information, including at least a z coordinate for the second time, based on the second location information, the first and second barometric information, and the change in vertical distance; and providing turn-by-turn navigation instructions using the updated second location information.

9. The method of claim 8, wherein detecting the change in vertical distance comprises:

determining first relative position information indicating a first relative height of the wearable accessory with respect to the portable electronic device at the first time;

determining second relative position information indicating a second relative height of the wearable accessory with respect to the portable electronic device at the second time; and comparing the second relative height to the first relative height.

10. The method of claim 9, wherein determining the first and second relative position information comprises detecting distance and angle information and compute the relative height based on the distance and angle information.

11. The method of claim 8, further comprising determining that the first location information includes a degree of accuracy meeting a predetermined threshold.

12. The method of claim 11, further comprising determining that the second location information includes a degree of accuracy that does not meet the predetermined threshold.

13. A non-transitory computer-readable medium storing instructions executable by one or more processors for performing a method of determining elevation information, comprising:

receiving first location information from a navigation system at a first time;

receiving first barometric information from a wearable accessory at the first time;

receiving second location information from the navigation system at a second time;

receiving, from the wearable accessory, second barometric information from the wearable accessory at the second time;

detecting a change in vertical distance between a portable electronic device and the wearable accessory from the first time to the second time;

determining updated second location information, including at least a z coordinate for the second time, based on the second location information, the first and second barometric information, and the change in vertical distance; and providing turn-by-turn navigation instructions using the updated second location information.

14. The non-transitory computer-readable medium of claim 13, wherein detecting the change in vertical distance comprises:

determining first relative position information indicating a first relative height of the wearable accessory with respect to the portable electronic device at the first time;

determining second relative position information indicating a second relative height of the wearable accessory with respect to the portable electronic device at the second time; and comparing the second relative height to the first relative height.

15. The non-transitory computer-readable medium of claim 14, wherein determining the first and second relative position information comprises detecting distance and angle information and compute the relative height based on the distance and angle information.

16. The non-transitory computer-readable medium of claim 13, further comprising determining that the first location information includes a degree of accuracy meeting a predetermined threshold.

17. The non-transitory computer-readable medium of claim 16, further comprising determining that the second location information includes a degree of accuracy that does not meet the predetermined threshold.

* * * * *